United States Patent
Moore et al.

(10) Patent No.: US 8,534,885 B2
(45) Date of Patent: Sep. 17, 2013

(54) SPOKE-MOUNTED WHEEL SAFETY LIGHT

(75) Inventors: Jerry Moore, Boulder, CO (US);
Christian James Moore, Boudler, CO (US)

(73) Assignee: Playhard, Inc., Boulder, CO (US)

(*) Notice: Subject to any disclaimer, the term of this patent is extended or adjusted under 35 U.S.C. 154(b) by 474 days.

(21) Appl. No.: 12/727,103

(22) Filed: Mar. 18, 2010

(65) Prior Publication Data

US 2010/0172145 A1 Jul. 8, 2010

Related U.S. Application Data

(63) Continuation-in-part of application No. 11/995,288, filed as application No. PCT/US2006/027692 on Jul. 14, 2006, now Pat. No. 7,683,275.

(60) Provisional application No. 60/699,152, filed on Jul. 14, 2005.

(51) Int. Cl.
*B60Q 1/06* (2006.01)

(52) U.S. Cl.
USPC ............................ 362/473; 362/500; 248/904

(58) Field of Classification Search
USPC ............... 248/201, 230.7, 231.81, 314, 689, 248/904; 224/419, 422, 447, 450; 362/473 X, 362/500 X
See application file for complete search history.

(56) References Cited

U.S. PATENT DOCUMENTS

| | | | |
|---|---|---|---|
| 3,392,275 A | 7/1968 | Henrich | |
| 4,201,448 A * | 5/1980 | Kagayama | 359/523 |
| 5,278,732 A * | 1/1994 | Frankum | 362/473 |
| 5,283,547 A * | 2/1994 | Leon | 340/432 |
| 5,418,697 A * | 5/1995 | Chiou | 362/473 |
| 6,109,762 A | 8/2000 | Hallgrimsson et al. | |
| 6,137,396 A | 10/2000 | Puppo | |
| 6,447,143 B2 | 9/2002 | Krietzman et al. | |
| 6,533,436 B2 | 3/2003 | Krietzman et al. | |
| 7,182,493 B2 * | 2/2007 | Huang | 362/500 |
| 7,683,275 B2 * | 3/2010 | Moore et al. | 200/17 R |
| 2003/0184998 A1 | 10/2003 | Collins | |
| 2003/0206409 A1 | 11/2003 | Parsons et al. | |
| 2004/0136186 A1 | 7/2004 | Hsu | |
| 2005/0073833 A1 | 4/2005 | VanderSchuit | |
| 2005/0152138 A1 | 7/2005 | Tatebe | |

FOREIGN PATENT DOCUMENTS

| | | |
|---|---|---|
| DE | 1151876 B | 7/1963 |
| DE | 10009742 A1 | 8/2001 |
| DE | 20314650 U1 | 11/2003 |
| EP | 1291577 A | 3/2003 |

OTHER PUBLICATIONS

In the US Patent and Trademark Office U.S. Appl. No. 11/995,288, Non-Final Office Action dated May 28, 2009, 6 pages; and corresponding response dated Aug. 21, 2009, 5 pages.

* cited by examiner

*Primary Examiner* — Gwendolyn Baxter
(74) *Attorney, Agent, or Firm* — Patton Boggs LLP

(57) ABSTRACT

An inexpensive, lightweight, water-resistant, and aerodynamic lighting device securely mounts to the spokes of a bicycle wheel for improved safety and visibility of the bicycle and rider at night. No tools or other materials are required for installation or removal of the device.

10 Claims, 7 Drawing Sheets

SPOKE-MOUNTED WHEEL SAFETY LIGHT

CROSS-REFERENCES TO RELATED APPLICATIONS

This Application is a Continuation-In-Part of U.S. patent application Ser. No. 11/995,288 filed on Jan. 10, 2008, which is the national stage application of PCT/US2006/027692 filed Jul. 14, 2006, which PCT Application claims the benefit of U.S. Provisional Application No. 60/699,152 filed on Jul. 14, 2005. The foregoing applications are hereby incorporated by reference to the same extent as though fully disclosed herein.

BACKGROUND OF THE INVENTION

1. Field of the Invention

The spoke-mounted wheel safety light relates in general to safety illumination systems, particularly those associated with bicycle wheels.

2. Statement of the Problem

It is common for most bicycles to include head lights and tail lights for night riding safety, not only for illumination of the road, but also to improve visibility of the bicycle and rider to drivers of other vehicles sharing the roadway at night. However, since these lights are directed frontward and rearward, they do not necessarily improve visibility on the sides of the bicycle. To remedy this, a number of inventors have attempted to improve bicycle safety by providing lighting devices which make the sides of spinning wheels more visible. Typical of these approaches are as follows:

Passive reflectors, which rely on light produced by oncoming vehicles, are generally included as standard issue on most bicycle wheels. However, these devices are ineffective during twilight hours when other vehicles may not yet have their lights on. In addition, wheel-mounted reflectors only work when the bicycle directly crosses perpendicular to the line of travel of the oncoming vehicle's headlamps which, at close range, may be too late to avoid collision.

One of the earliest "active" illumination systems for bicycle wheels employed phosphorescent material attached to or woven through the spokes of bicycle wheels. Although this approach produces a dim glow at night, the phosphorescent material is ineffective during morning and evening twilight hours due to high ambient light level. In addition, the glow is not long lasting and such devices require frequent and inconvenient recharging by exposure to a strong light source.

Some bicycle wheel lighting systems employ chemilucent liquids contained in short cylindrical or long tubular containers as a light source affixed to the wheel with assorted clips and clamps. These systems are relatively bulky and the liquid itself is heavy. In addition, once the chemical reaction is initiated, the usable light output only lasts a few hours and the chemilucent material must be removed, discarded, and replenished after each use.

Other bicycle wheel illumination systems employ electrically powered arrays of light emitting diodes (LEDs) or electroluminescent wires attached to, wound around, or woven through the wheel spokes. However, even with complex dimming, pulsing, or other energy conserving circuitry, these systems require relatively large batteries that require frequent replacement. The additional weight and complexity of these systems makes them cumbersome, expensive, and difficult to install and removal; and they deteriorate the aerodynamic performance of the wheels on which they are mounted.

Another more recent wheel illumination system employs a small LED and battery which are screw-mounted on the threaded stem of the bicycle tire air valve. The attachment method is novel; however, the device needs to be removed frequently and reinstalled for routine maintenance of tire air pressure. Furthermore, the small size of the LED and enclosure provides minimal illumination of the wheel.

None of these or other systems provide for bright, long-lasting, and inexpensive illumination of a moving bicycle wheel without adding weight or bulk which might unduly affect the aerodynamic performance and maintainability of the bicycle. What is needed is a bicycle wheel safety lighting system that couples the efficiency and economy of an LED with a means of distributing light which is integral to the device itself in order to provide an illumination system with minimal control circuitry, power consumption, volume, and weight in an aerodynamic form factor which does not require any tooling or special skills to install or maintain.

SUMMARY

Embodiments of a light holder include a switch module, a body member, and a cap member. One such light holder is referred to as a spoke light. One embodiment of a spoke light includes a switch module, a body member, and a cap member.

In one embodiment, a mount or spoke light for mounting a lighting device includes a body having a recess for holding a lighting device, a front surface, a hemispherical raised spoke grip extending from the front surface, a right slot and a left slot formed in the hemispherical raised spoke grip, the right slot and left slot including a chamfered slot throat. In one alternative, the mount further includes a back surface on the body, and a right and left bumper, aligned along a longitudinal centerline of the back surface. In another alternative, the recess is located interior to the hemispherical raised spoke grip in the body. Optionally, the recess is a cylindrical cavity at the center of the body. In one alternative, the cylindrical cavity has an annular raised wall extending from a back surface, an annular raised ring or semicircular profile formed on an exterior curved surface of the annular raised wall. In another alternative, the mount further includes a cap interfaced with the annular raised wall and annular raised ring closing the recess. In one option, the cap has a convex hemispherical top surface, a concave hemispherical bottom surface, a convex hemispherical switch actuator extending for the center of the bottom surface, an annular lip which smoothly joins and closes the periphery of the top surface and the bottom surface, and an annular concave groove recessed in the bottom surface near the annular lip. In one alternative, the mount further includes a miniature switch and battery module located in the recess, including a battery harness and a printed circuit board, the battery harness and printed circuit board arranged to hold a battery between them, and a momentary switch element in electrical contact with said circuit board and located to be activated by compression against said circuit board, wherein said momentary switch element is located to be in physical contact with one pole of the at least one battery when said battery is placed between said harness and said circuit board, and said momentary switch element is located between said battery and said circuit board. In another alternative, the momentary switch element includes a diaphragm type switch element.

In another embodiment, a mount for mounting a lighting device on bike spokes includes a body having a recess for holding a lighting device, a front surface, a hemispherical raised spoke grip extending from the front surface, a right slot and a left slot formed in the hemispherical raised spoke grip, the right slot and left slot including a chamfered slot throat, with at least one of the right slot and left slot engaged with a first spoke of the bike spokes. In one alternative, the mount further includes a back surface on the body, a right bumper and a left bumper, aligned along a longitudinal centerline of the back surface, the right bumper and the left bumper engaged with a respective second and third spoke of the bike spokes. In another alternative, the mount further includes a miniature switch and battery module located in the recess, including a battery harness and a printed circuit board, the battery harness and printed circuit board arranged to hold a battery between them, and a momentary switch element in electrical contact with the circuit board and located to be activated by compression against the circuit board, wherein the momentary switch element is located to be in physical contact with one pole of the at least one battery when the battery is placed between the harness and the circuit board, and the momentary switch element is located between the battery and the circuit board. Optionally, the recess is a cylindrical cavity at the center of the body. In one alternative, the cylindrical cavity has an annular raised wall extending from a back surface and an annular raised ring of semicircular profile formed on an exterior curved surface of the annular raised wall. The mount optionally includes a cap interfaced with the annular raised wall and annular raised ring closing the recess. Optionally, the cap has a convex hemispherical top surface, a concave hemispherical bottom surface, a convex hemispherical switch actuator extending from the center of the bottom surface, an annular lip which smoothly joins and closes the periphery of the top surface and the bottom surface, and an annular concave groove recessed in the bottom surface near the annular lip.

In one embodiment, a method of mounting a mount housing a light on bike spokes includes providing a mount having a body, the body including a recess for holding a lighting device, a front surface, a hemispherical raised spoke grip extending from the front surface, a right slot and a left slot formed in the hemispherical raised spoke grip, the right slot and left slot including a chamfered slot throat, a back surface on the body, a right bumper and a left bumper aligned along a longitudinal centerline of the back surface, and engaging a first spoke of the bike spokes with at least one of the right slot and left slot. In one alternative, the method further includes engaging the right bumper and the left bumper with a respective second and third spoke of the bike spokes, such that pressure from the engagement of the right and left bumper against the second and third spokes contributes to preventing the at least one of the right slot and left slot from slipping on the first spoke. Optionally, the first spoke is located on the front surface of the body and the second and third spoke are located on the back surface of the body.

Numerous other advantages and features will become apparent from the following detailed description when read in conjunction with the drawings.

DETAILED DESCRIPTION

Figure 1:
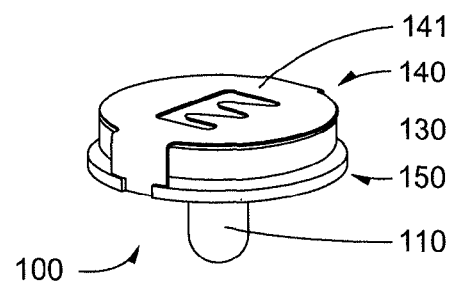
FIG. 1 is an isometric view of switch module 100 of spoke light 50 according to one embodiment of a light holder.
Figure 2:
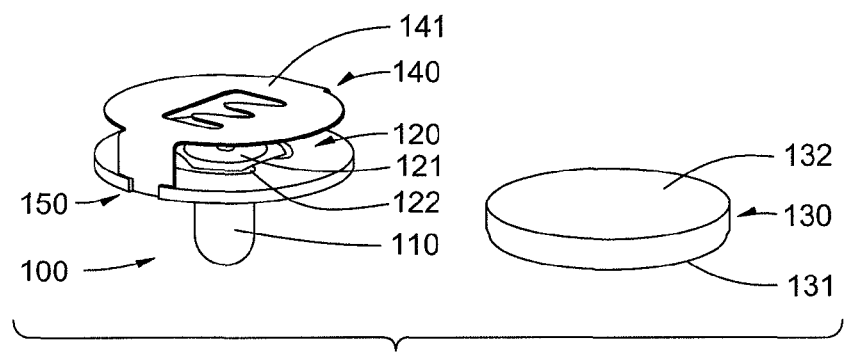
FIG. 2 is an isometric view of switch module 100 of spoke light 50 with the battery removed for clarity.

Disclosed herein are embodiments of a light holder. Generally, embodiments of the light holder include a switch module, a body member, and a cap member. The switch module is a device for actuating the integrated light. Generally, the switch module is contained within the body member and cap member. In many optional configurations, the switch module responds to pressure for actuation, the pressure being applied to the body member and/or the cap member. A variety of body members are usable as part of the light holder. Many of the body members have a special purpose. Such purposes include, but are not limited to, attaching to bike spokes, attaching to key chains, attaching to carabineers, and such body members that are wearable as jewelry or wrist bands. Exemplary embodiments of the light holder and the light holder's subcomponents are described below. One such light holder is referred to as a spoke light.

One embodiment of a spoke light 50 comprises: switch module 100, body member 200, and cap member 300. Exemplary embodiments of each module and member are described below.

In one embodiment, switch module 100 comprises printed circuit board 150, momentary contact switch 120, battery 130, and battery harness 140. In this particular example, module 100 is integrated with a light emitting diode (LED) 110 and functions to control the lighting of the LED.

Figure 3:
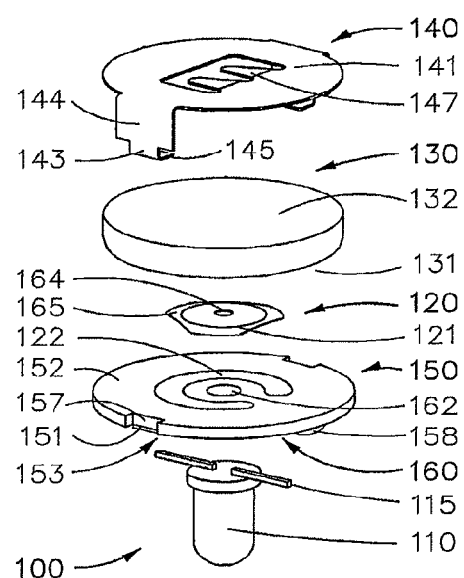
FIG. 3 is an exploded view of switch module 100 of spoke light 50 with additional details of the various parts shown.
Figure 4:
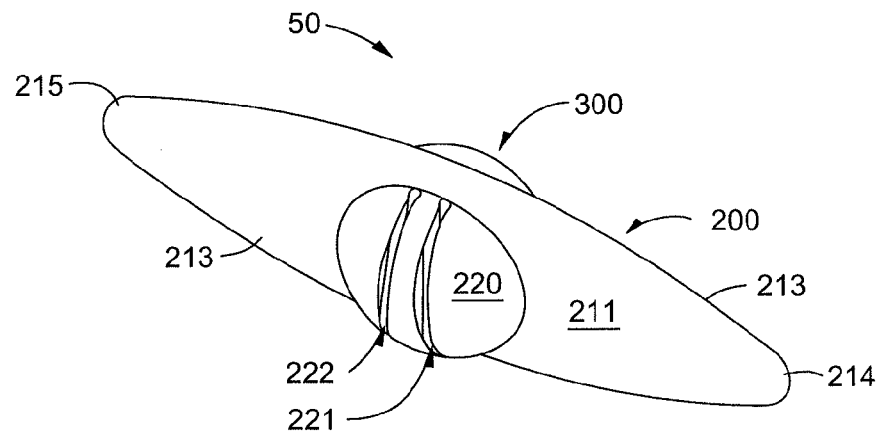
FIG. 4 is an isometric drawing of one embodiment of the switch module as viewed toward front surface 211 of spoke light 50.
Figure 5:
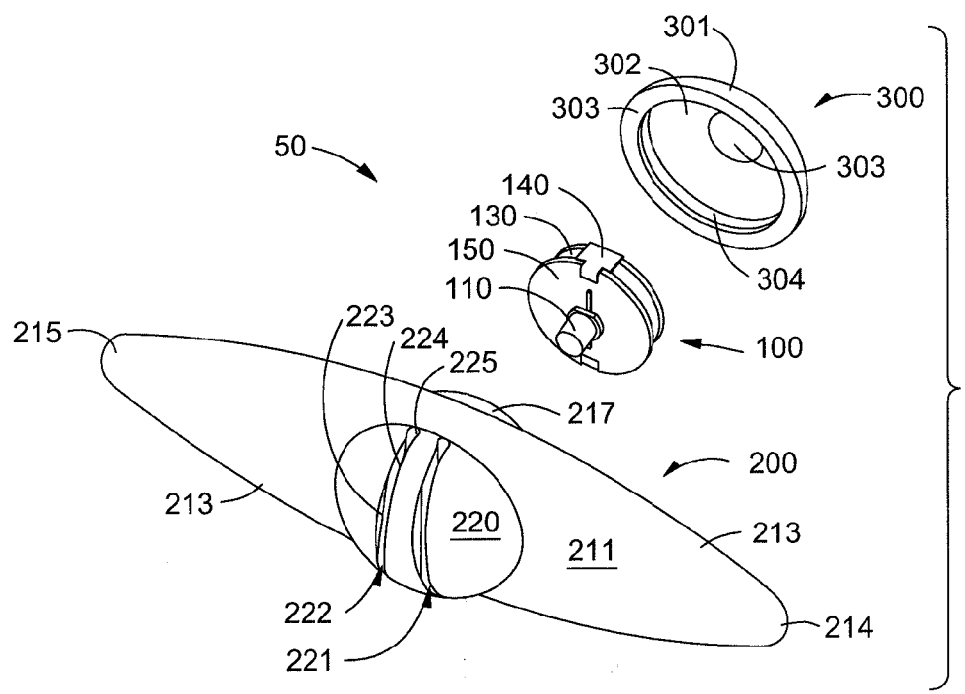
FIG. 5 is an exploded view of the embodiment depicted in FIG. 4.
Figure 6:
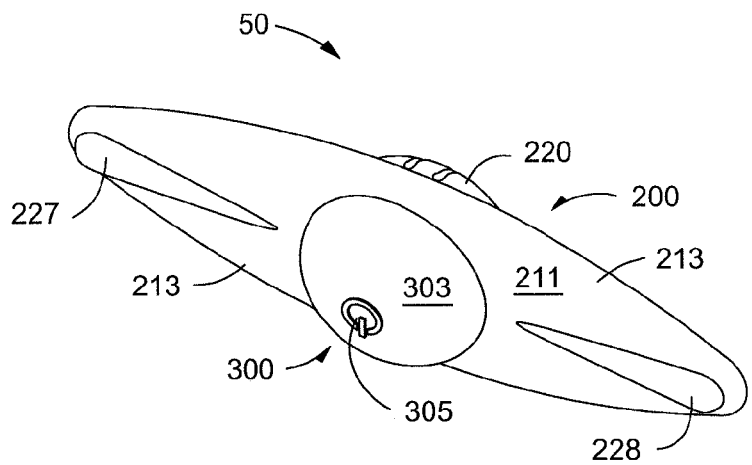
FIG. 6 is an isometric drawing of one embodiment of a spoke light as viewed toward back surface 212 of spoke light 50.
Figure 7:
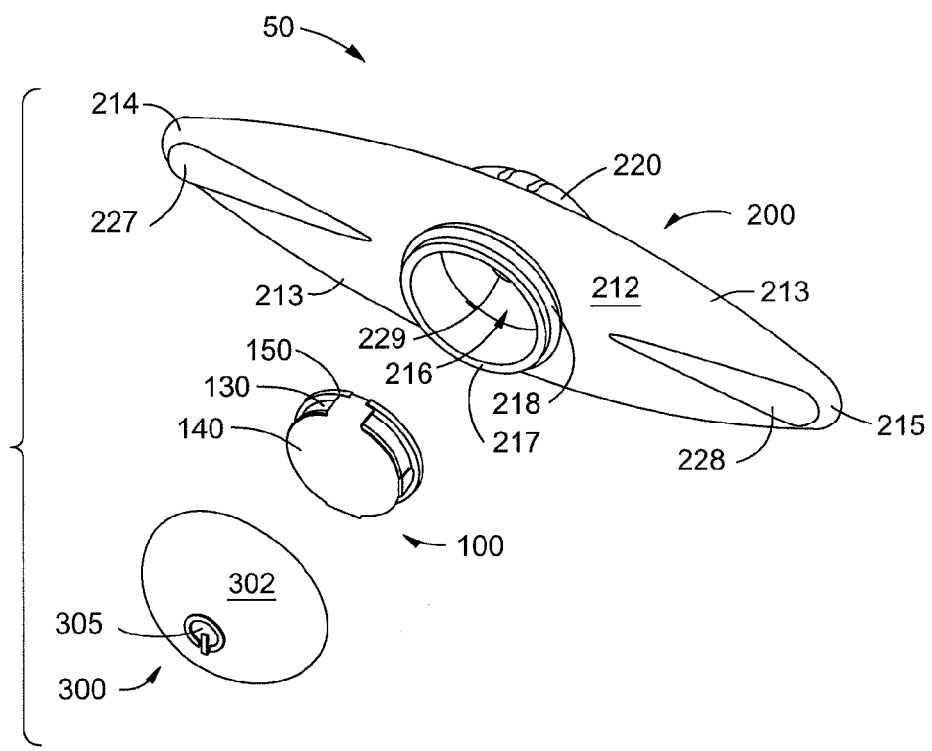
FIG. 7 is an exploded view of the embodiment depicted in FIG. 6.
Figure 8:
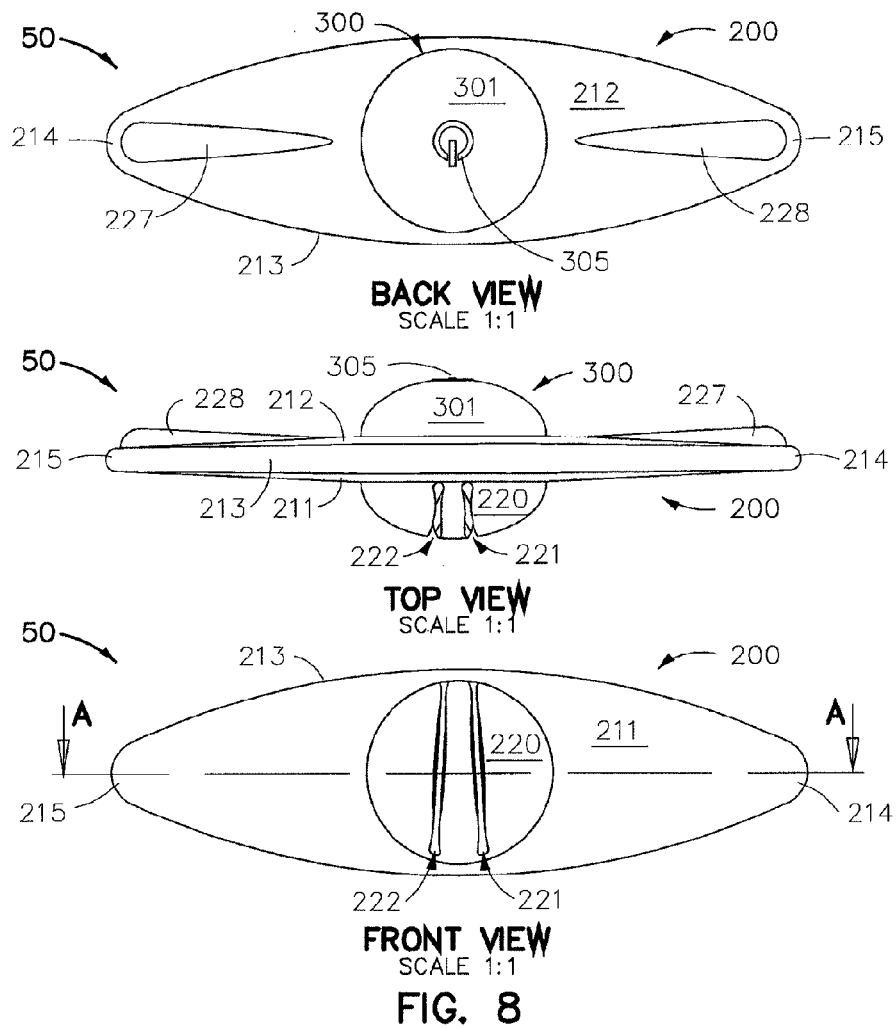
FIG. 8 is a compilation of the front, top, and back orthographic projections of spoke light 50 according to the spoke light of FIG. 6.

Printed circuit board 150 is made of conventional printed circuit board materials and includes electrical traces, such as 122, 162, and 151 (FIG. 3) and an integrated circuit chip 158. It is of a shape and size to match the dimensions of 130, which in this case is disk-shaped. In alternatives, the printed circuit board is sized to fit with different size and shape cases. Circuit board 150 includes notches 157, the function of which will be discussed below.

Momentary contact switch 120 includes mechanical switch element (which includes a battery contact) 121, momentary switch contact (which is also referred to as an electrical trace) 162 on printed circuit board 150, and logic included in integrated circuit chip 158. Printed circuit board 150 with bottom face 160 contains an electronic circuit 153 having components associated with the functional performance of the switch and the electronic device 110 that is operated by the switch module 100, which, in this case is LED 110. In this example, the circuit 153 controls the level and timing of electrical power provided to LED 110. The particular circuits for activating and deactivating the momentary switch 120 in response to an electronic pulse and for controlling electronic device 110 are known in the art and will not be discussed in detail herein. It is contemplated that any such circuit may be used. Mechanical switch element 121 comprises a diaphragm 121 having a first battery and momentary switch contact 164 and circuit contacts 165 which are mounted over and make contact with associated conductor traces 122 on the top face 152 of circuit board 150. A feature is that the momentary switch element 121 also provides the contact to one of the poles of the battery 130.

Battery 130 is a conventional coin cell battery and has negative pole 131 in contact with diaphragm switch battery contact 164 and positive pole 132 facing toward harness 140. This polarity is selected in this embodiment to cooperate with the voltage required by the logic in integrated circuit chip 158. However, the opposite polarity is also possible with appropriate logic and circuit adaptations.

Battery harness 140 may be any device that stabilizes and holds the battery to the circuit board 150. A feature of switch module 100 is that the battery harness also provides the contact to one of the poles of battery 130. In one example, battery harness 140 comprises a disk-shaped conductor 141 having die-cut harness battery contacts 147 located near the center of the disk 141. Harness 140 also includes legs 144 which extend around battery 130. Legs 144 each terminate in a flange 143 having an inward bent lip 145. Flange 143 fits into notch 157 in circuit board 150 to locate harness 140 properly with respect to the circuit elements and prevent rotary motion between the harness and circuit board. Lip 145 fits under the bottom edge of circuit board 150 and makes contact with traces 151 on the circuit board.

LED 110 includes electrical terminals 115, which connect to circuitry 153 on the underside of circuit board 150, and light output end 111.

Harness 140 holds battery 130 securely in place while allowing installation and replacement of battery 130, and also provides contact between circuit 153 and the positive pole 132 of battery 130. An exemplary material for harness 140 is tin-coated steel but may be made of steel with other conductive coatings, brass, or other suitable conductive material or non-conductive material with conducting coatings. In one example, harness 140 is flexible enough to bend sufficiently when pressed to operate the switch, but sufficiently rigid to firmly hold battery 130. When the battery is inserted, there should be enough tension between the harness, battery, and circuit board to hold the battery firmly without sliding, but not so much tension as to activate mechanical switch element 121. The actuating area, disk-shaped conductor 141 of harness 140, lies opposite diaphragm 121 and is flexible enough to deflect slightly when pressed by the user. Battery 130 transfers the movement of actuating area 141 to diaphragm 121 which contacts circuit trace 162 and activates switch 120. When the user releases pressure, the spring action of diaphragm 121 returns battery 130 and actuating area 141 to their original positions, thus deactivating switch 120. However, in this position, switch element/contact 121 continues to function to provide an electrical connection between the negative pole 131 of battery 130 and trace 122. Battery 130 with positive pole 132 and negative pole 131 is mounted in harness 140 and provides electrical power to device 100.

Circuitry 153 including integrated circuit chip 158 is arranged to control the modal state of device 100 when activated. When circuit 153 is off and momentary switch circuit 120 is closed by contact of contact 164 with trace 162, the circuit 153 is activated and, in this case, LED 110 turns on. When circuit 153 is on and momentary switch circuit 120 is closed by contact of contact 164 with trace 162, the circuit 153 is deactivated and, in this case, LED 110 turns off. Similarly, if an audio device instead of an LED was integrated with module 100, the audio would turn on when the circuit 153 is activated and turn off when the circuit is deactivated. Similarly, the switch module 100 may be integrated with many other electronic devices. Circuit 153 may also contain elements to control the operation of the integrated electronic device 110. For example, the LED may be a multicolored LED and the circuit 153 would include elements to sequentially turn on the various colors according to a predetermined timing sequence.

In one embodiment, body 200 of spoke light 50 comprises: front surface 211; back surface 212; convex curved edge 213, which smoothly joins and closes the periphery of front surface 211 and back surface 212; distal right end 214 and distal left end 215 of edge 213; cylindrical container 216 which is recessed in the center of back surface 212; LED recess 229 formed as a cylindrical cavity at the center of container 216; an annular raised wall 217 formed around the periphery of container 216 and extending from back surface 212; an annular raised ring 218 of the semicircular profile formed on the exterior curved surface of wall 217; a hemispherical raised spoke grip 220 extending from the center of front surface 211; right slot 221 and left slot 222 formed as channels through spoke grip 220, said right slot 221 and left slot 222 each further comprising chamfered slot throat 223, narrowed slot neck 224, and rounded slot bottom 225; right bumper 227 aligned along the longitudinal centerline of back surface 212 and extending as a tapered raised semi-cylinder from wall 217 toward a rounded termination near right end 214; and left bumper 228 aligned along the longitudinal centerline of back surface 212 and extending as a tapered raised semi-cylinder from wall 217 toward a rounded termination near left end 215. Body 200 and its comprising elements are formed from a transparent or dye-colored resilient plastic which is capable of conducting light.

In alternative embodiments of the light holder, other body members are used. Body members include such alternatives as ball-shaped body members, those that have attachment points for articles such as key chains, those that have attachment points for articles such as carabineers, and those that have body members that are wearable as jewelry or wrist bands.

In one embodiment, cap 300 of spoke light 50 comprises: convex hemispherical top surface 301; concave hemispherical bottom surface 302; convex hemispherical switch actuator 303 extending from the center of bottom surface 302; annular lip 303 which smoothly joins and closes the periphery of top surface 301 and bottom surface 302; annular concave groove 304 recessed in bottom surface 302 near lip 303; and embossed actuation symbol 305 centered on top surface 302. Cap 300 and its comprising elements are formed from a transparent or dye-colored resilient plastic which is capable of conducting light.

In one arrangement, during operation of spoke light 50, switch module 100 is disposed in container 216 of body 200 with LED 110 further disposed in recess 229 of body 200, thus allowing light emanating from LED 110 to disperse throughout translucent body 200 and effectively illuminate the entirety of spoke light 50.

The resilient plastic of cap 300 is pliable enough for lip 303 of cap 300 to stretch over ring 218 of body 200, thus allowing groove 304 of cap 300 to mate and seal with ring 218 of body 200 providing a water- and dirt-resistant compartment enclosing switch module 100 and LED 110. Removal of cap 300 allows for simple and easy access to switch module 100 for replacement of battery 130. The resilient material of cap 300 also allows for actuation of momentary switch 120 of switch module 100 when pressure is applied to actuation symbol 305 on top surface 301 of cap 300 and transferred through switch actuator 303 to actuating area 141 of switch module 100. In one alternative, the resilient plastic is not pliable enough to stretch over the ring of the body; instead, the ring of the body is pliable and deforms to fit.

Figure 9:
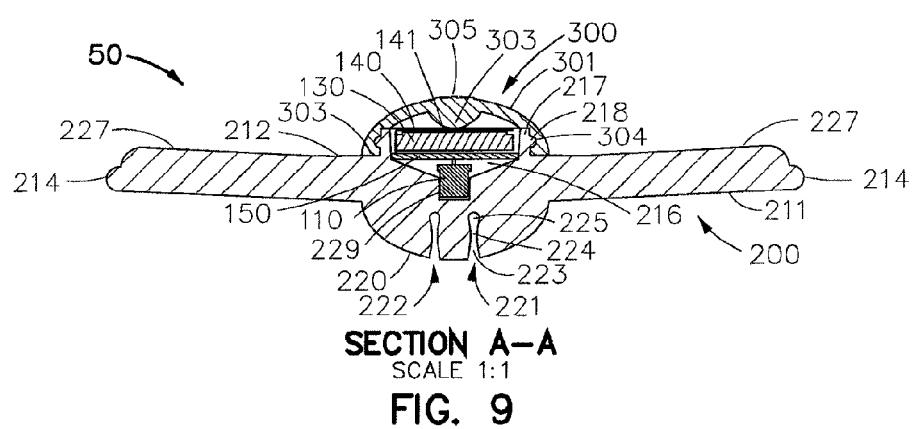
FIG. 9 is a longitudinal section of spoke light 50 as viewed from the top with reference to the section cut line indicated on FIG. 8.
Figure 10:
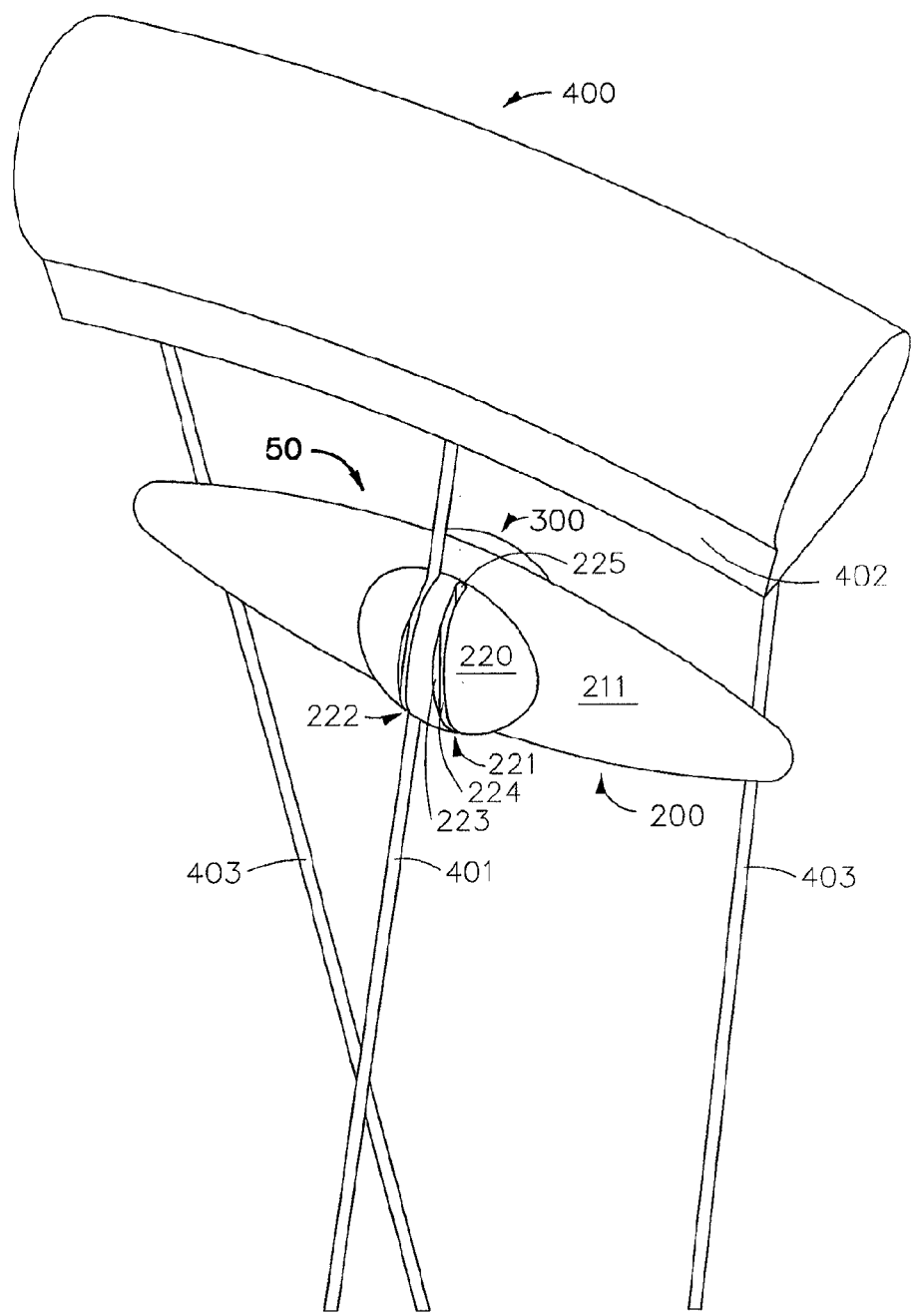
FIG. 10 is an isometric drawing of the spoke light of FIG. 6 as installed on a bicycle wheel and viewed toward front surface 211 of spoke light 50.
Figure 11:
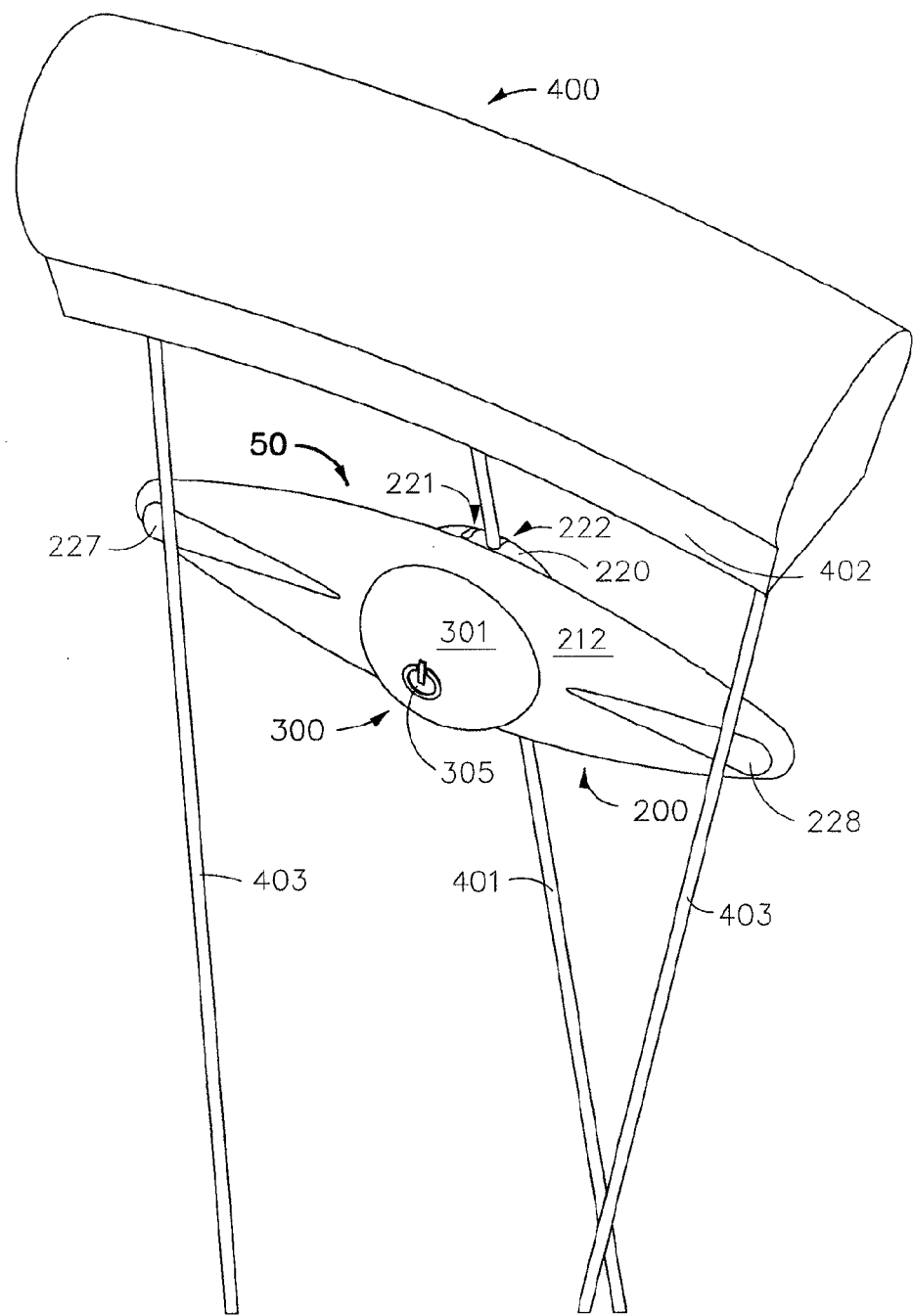
FIG. 11 is an isometric drawing of the spoke light of FIG. 6 as installed on a bicycle wheel and viewed toward back surface 212 of spoke light 50.

In one example, spoke light 50 is installed on wheel 400 as depicted in FIGS. 9 and 10 through the following procedure. The user identifies a spoke for mounting and places spoke light 50 behind the selected spoke 401 near the midpoint of spoke 401 with spoke grip 220 and front face 211 of body 200 facing the user. Selected spoke 401 may have a slight rightward or leftward skew relative to a true radial line from the center of the wheel. The user then aligns selected spoke 401 with the chamfered sides of slot throat 223, choosing either right slot 221 or left slot 222 (whichever best matches the skew of selected spoke 401) and, with squeezing force applied to both selected spoke 401 and spoke light 50, snaps selected spoke 401 through slot neck 224 until selected spoke 401 is fully seated in slot bottom 225. To complete the installation, user slides spoke light 50 along selected spoke 401 towards wheel rim 402 until right bumper 227 and left bumper 228 of spoke light 50 gently wedge against adjacent spokes 403. Spoke light 50 remains firmly in this position on selected spoke 401 due to action of the following forces: the gripping action of the undersized slot throat on selected spoke 401; the stabilizing wedging action of right bumper 227 and left bumper 228 on adjacent spokes 403; and centrifugal forces acting on spoke light 50 which keep it seated in its original installed position whenever the wheel rotates. Modal control of spoke light 50 is accomplished by one or more presses applied to actuation symbol 305 on top surface 301 of cap 300, and this action also serves to keep spoke light 50 properly seated on selected spoke 401.

Removal of spoke light 50 from wheel 400 is accomplished simply by reversing the installation procedure described above. No tools are required for installation or removal.

Other embodiments may additionally include some or all of the following features: larger cylindrical battery sizes and/or multiple batteries arranged in series; location of the battery/switch on variously sized or shaped printed circuit boards; placement of the battery/switch assembly remote from the main circuit board of the device which is served; arrangement of the battery/switch assembly to operate with user actuation pressure applied to the side of the assembly opposite of the diaphragm in lieu of pressure on the battery harness; enclosure of the battery/switch assembly in compartments or containers associated with the device which is served; integration of discrete components of the battery/switch assembly into a single component; incorporation of flexible membranes which transfer actuation pressure by the user and protect the assembly from contamination by water or debris; modification of the profile and shape of the device body for aesthetic or promotional considerations; inclusion of a single mounting slot in the spoke in lieu of separate right-hand and left-hand skewed slots; variations of the profile of the spoke slots to accommodate non-standard spoke shapes; and extension and adaptation of the device for use on non-bicycle spoked wheels.

In its various configurations, switch module 100 allows the battery and switch to effectively occupy the same interior volume of space while also freeing up usable area on the circuit board and exterior surface of the device which would otherwise have been devoted to the separate components. Examples of devices which could beneficially employ the switch module include, but are not limited to, the following: remote control transmitters; sound emitting devices; flashlights; battery-operated toys and games; miniature lighting devices; electronic timers; and lighted pushbuttons.

A feature of switch module 100 is that momentary switch element 121 can be switched from either side of the printed circuit board. As indicated above, it can be activated by pressing on harness 140. It can also be activated by pressing on the LED (integrated electronic element) 110 or the circuit board 150. Another feature of switch module 100 is its compact size. The size is largely determined by the battery. In one embodiment, it is 22 millimeters (mm) in diameter and 8 millimeters (mm) thick, including two coin-cell batteries. The thickness, excluding the battery 130 and electronic device 110, is from 2 mm to 8 mm thick. In an alternative, it is 3 mm to 6 mm thick. In another alternative, it is 3 mm to 4 mm thick.

There has been described an example of light holders such as a spoke light, including a switch module, body member, and cap member. It should be understood that the specific formulations and methods described herein are exemplary and should not be construed to limit the spoke light and its components, which will be described in the claims below. Further, it is evident that those skilled in the art may now make numerous uses and modifications of the specific embodiments described without departing from the inventive concepts. As one example, one or more batteries may be used. As another example, the elements of the device may be incorporated with a type A, type AA, type AAA, type C, or type D battery. The battery will make the module larger, but at the same time the simplicity and compactness of the structure will permit much smaller modules with these types of batteries. For example, a small, pushbutton flashlight can be made using the principles of the light holder disclosed herein.

We claim:

1. A mount for mounting a lighting device, the mount comprising:
    a body having:
        a recess for holding a lighting device;
        a front surface;
        a spoke grip on the front surface;
        a first slot integrated with the spoke grip;
        a back surface on the body; and
        a right bumper and a left bumper, aligned along a longitudinal centerline of the back surface, each of the right and left bumper extending as a tapered raised semicylinder from the recess toward a rounded termination end.

2. The mount of claim 1 wherein the first slot includes a chamfered slot throat.

3. The mount of claim 2, further comprising: a second slot formed in the spoke grip, wherein the second slot includes a chamfered slot throat.

4. The mount of claim 1 wherein the recess is located interior to the spoke grip in the body.

5. The mount of claim 1 wherein the recess is a cylindrical cavity at the center of the body.

6. The mount of claim 5 wherein the cylindrical cavity has an annular raised wall extending from a back surface and an annular raised ring of semicircular profile formed on an exterior curved surface of the annular raised wall.

7. The mount of claim 6, further comprising:
    a cap interfaced with the annular raised wall and annular raised ring closing the recess.

8. The mount of claim 7 wherein the cap has a convex hemispherical top surface, a concave hemispherical bottom surface, a convex hemispherical switch actuator extending from the center of the bottom surface, an annular lip which smoothly joins and closes the periphery of the top surface and the bottom surface, and an annular concave groove recessed in the bottom surface near the annular lip.

9. The mount of claim 1, further comprising:
a miniature switch and battery module located in the recess, including:
   a battery harness, and
   a printed circuit board,
   said battery harness and printed circuit board arranged to hold a battery between them; and
a momentary switch element in electrical contact with said circuit board and located to be activated by compression against said circuit board, wherein said momentary switch element is located to be in physical contact with one pole of the at least one battery when said battery is placed between said harness and said circuit board, and said momentary switch element is located between said battery and said circuit board.

10. The mount of claim 9 wherein said momentary switch element comprises a diaphragm switch element.

* * * * *